United States Patent [19]

Pekarsky

[11] Patent Number: 4,792,348

[45] Date of Patent: Dec. 20, 1988

[54] METHOD OF FORMING GLASS BONDED JOINT OF BETA-ALUMINA

[75] Inventor: Alina V. Pekarsky, Willowdale, Canada

[73] Assignee: Powerplex Technologies, Inc., Downsview, Canada

[21] Appl. No.: 20,354

[22] Filed: Mar. 2, 1987

[51] Int. Cl.[4] .................... C03B 23/20; C03B 33/08; C03B 9/42; C03C 27/00

[52] U.S. Cl. .......................................... 65/36; 65/42; 65/43; 65/152

[58] Field of Search .............. 65/36, 40, 42, 43, 152, 65/155; 219/10.55 M; 501/14–17, 20, 21

[56] References Cited

U.S. PATENT DOCUMENTS

| | | | |
|---|---|---|---|
| 4,064,209 | 12/1977 | Desplanches et al. | 65/155 |
| 4,066,427 | 1/1978 | Goto | 65/40 |
| 4,199,340 | 4/1980 | Topping et al. | 65/40 |
| 4,207,386 | 6/1980 | Meinhold et al. | 429/62 |
| 4,529,856 | 7/1985 | Meek et al. | 219/10.55 M |
| 4,529,857 | 7/1985 | Meek et al. | 219/10.55 M |
| 4,606,748 | 8/1986 | Blake et al. | 65/36 |

Primary Examiner—David L. Lacey
Assistant Examiner—Michael K. Boyer
Attorney, Agent, or Firm—Cushman, Darby & Cushman

[57] ABSTRACT

A method of producing a joint between a beta-alumina electrolyte tube and alpha-alumina flange with a glass bonding agent in a solid annular bead form devoid of additives such as a coupling agent or the like capable of being heated when subjected to microwave energy which comprises utilizing in the heating step a source of microwave energy rather than a gas flame or electrical resistance heat source so as to heat the beta-alumina tube by microwave energy for a time period sufficient to enable the heat generated in the beta-alumina tube to be conducted to glass bead and the alpha-alumina flange and heat the glass bead to a temperature above the glass deformation point, and allowing the tube to cool to solidify the glass bead in intimately penetrating relation to the surfaces of the beta-alumina tube and alpha-alumina flange engaged thereby so that the glass forms a bond between the beta-alumina tube and the alpha-alumina flange characterized by a fusion of the glass within the engaged beta-alumina and alpha-alumina.

4 Claims, 4 Drawing Sheets

METHOD OF FORMING GLASS BONDED JOINT OF BETA-ALUMINA

BACKGROUND OF THE INVENTION

This invention relates to sodium sulfur batteries and more particularly to methods of producing a joint between a body of beta-alumina such as a sodium sulfur cell electrolyte tube and a body of alpha-alumina such as an insulating ring for the electrolyte tube with a glass bonding agent.

Sodium sulfur batteries are known. The known characteristic of sodium sulfur batteries is that they provide a highly desirable power output to weight ratio. The known disadvantage of sodium sulfur batteries is that they are difficult to manufacture economically so as to operate with any high degree of reliability. If the joint between the electrolyte tube and the insulating ring for the tube of the sodium sulfur cell fails, the cell itself is essentially in a fail mode. Heretofore, this joint has been produced by assembling the electrolyte tube, the insulating ring, and a ring of glass bonding agent and then subjecting the assembled elements of the joint to heat from a gas flame or electrical resistant heat source. Typically, the joint is subjected to a maximum temperature of 1100° C. for a treatment period of approximately sixteen hours, a significant portion of which constitutes an annealing step. The energy consumption is substantially high both because of the magnitude of the heating step and particularly the long duration of the annealing step. There is sufficient excess cost involved in the process of producing the joint mentioned above and sufficient lack of reliability in the joint so produced as to establish a need for a economical method which will produce a more reliable joint.

SUMMARY OF THE INVENTION

It is an object of the present invention to fulfill the above-described need. In accordance with the principles of the present invention, this objective is achieved by utilizing in the heating step a source of microwave energy rather than a gas flame or electrical resistance heat source. The beta-alumina body exemplified by the electrolyte tube and the alpha-alumina body exemplified by the insulating ring together with the glass body constituting the bonding agent engaged to surfaces of the other two bodies is subjected to microwave energy from the microwave source so as to heat the beta-alumina body by microwave energy for a time period sufficient to enable the heat generated in the beta-alumina body to be conducted to said glass body and the alpha-alumina body and heat the glass body to a temperature above the glass deformation point. Thereafter, the bodies are allowed tb cool to solidify the glass body in intimately penetrating relation to the surface of the beta-alumina and alpha-alumina engaged thereby so that the glass body forms a bond between the beta-alumina body and the alpha-alumina body characterized by a fusion of the glass within the engaged betaalumina and alpha-alumina to an extent greater than that occurring when all three bodies are subjected to heat from a gas flame or electrical resistant heat source for the predetermined time period heretofore used to accomplish the joint. The time period to which the bodies are subject to microwave energy is (1) not substantially longer than that required to heat the glass to its deformation point and (2) significantly less than the predetermined time period heretofore utilized in heating the joint with a gas flame or electrical resistance heat source.

It is recognized that it has been proposed heretofore to effect a ceramic-glass-ceramic seal by microwave heating. See, for example, U.S. Pat. Nos. 4,529,856, 4,529,857, and 4,606,748. However, it will be noted that in all of these disclosures there is no specific contemplation of the utilization of a beta-alumina as the ceramic material. The essential characteristic of the microwave heating process disclosed in these patents is the provision of a coupling agent in the sealing material or bonding agent. Specifically, the sealing material is a slurry of glass and the coupling agent is added thereto for the specific purpose of creating a heat in the glass sealing material in response to the application of microwave energy so as to accomplish the melting of the glass sealing material with respect to the two ceramic workpieces to be joined. The utilization of coupling agents or other additives in the glass bonding agent of a sulfur cell joint is disadvantageous in that such additives would increase internal porosity and would detrimentally affect reliability and durability of the joint in operation. Consequently, the method taught in the above-noted patents would be clearly unsuitable for producing a joint between a beta-alumina electrolyte tube and an alpha-alumina insulating ring such as herein contemplated. Nevertheless, applicant has found that such a joint can be produced in accordance with the principles of the present invention without the essential coupling agent of the prior art and its function. Indeed, the present invention relies upon the direct microwave heating of the beta-alumina electrolyte tube and the heating of the glass sealing material or bonding agent primarily through heat conduction and convection from the beta-alumina body and through the alpha-alumina body which preferably is also heated by conduction and convection from the beta-alumina body.

While the present invention has been developed to fulfill the particular need with respect to joints in sodium sulfur battery cells, the method has applicability in producing any joint between a body of beta-alumina and an electrically insulating ceramic body with the use of a heat activated ceramic bonding agent in any situation where the need for purity in the joint requires the use of a heat activated ceramic bonding agent devoid of additives such as coupling agents capable of being heated when subject to microwave energy.

Another object of the present invention is the provision of an improved glass bonding agent joint between a beta-alumina electrolyte tube and an alpha-alumina insulating ring, the improved joint having the characteristics as shown in the attached drawings or as produced in accordance with the principles of the method of the present invention.

These and other objects of the present invention will become more apparent during the course of the following detailed description and appended claims.

DESCRIPTION OF THE DRAWINGS

The invention may best be understood with reference to the accompanying drawings wherein an illustrative embodiment is shown.

In the drawings.

DETAILED DESCRIPTION

Figure 1:
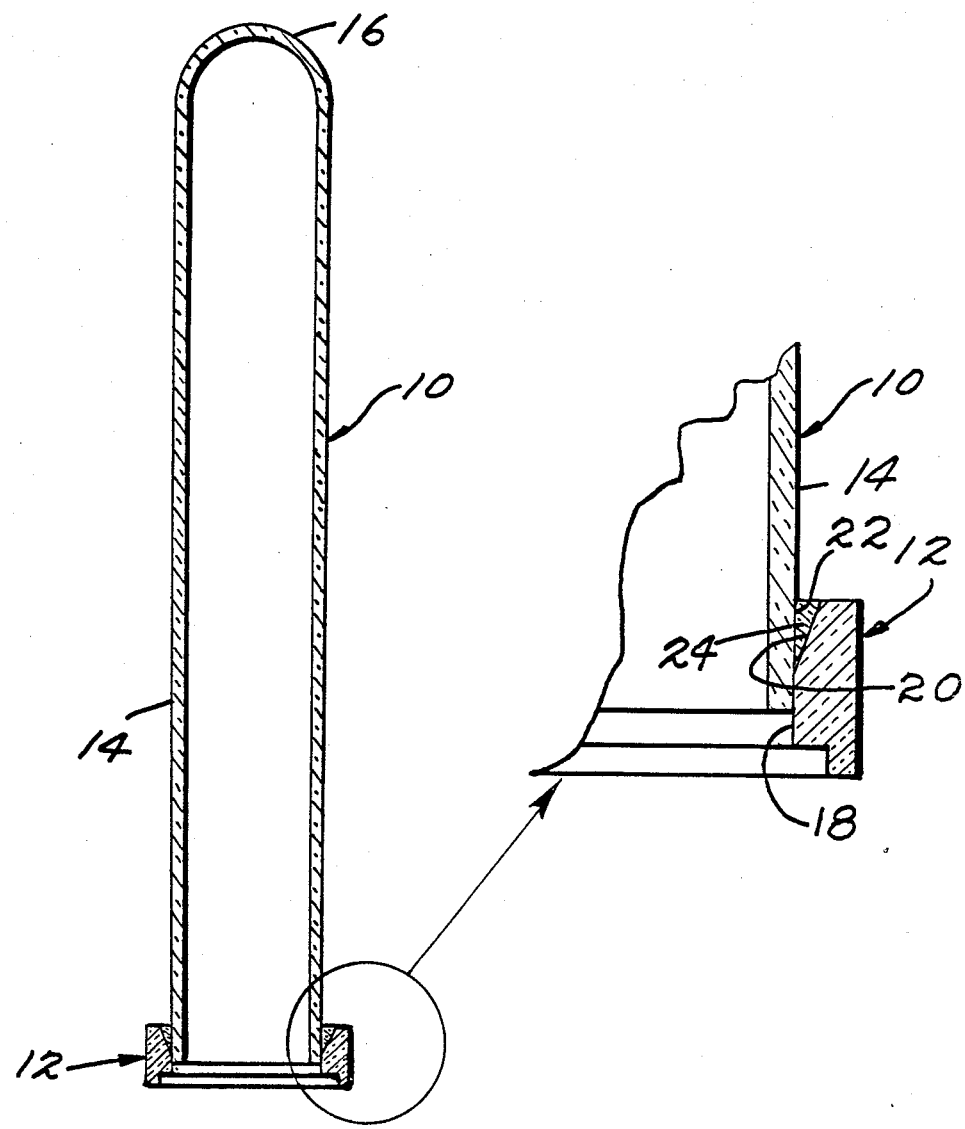
FIG. 1 illustrates an assembled beta-alumina electrolyte tube, alpha-alumina insulating ring and glass bonding agent ring inverted as they would be placed in the microwave oven in accordance with the principles of the present invention.

Referring now more particularly to the drawings there is shown in FIG. 1 two components of a sodium sulfur battery cell, one a beta-alumina electrolyte tube, generally indicated at 10 and the other an insulating ring, generally indicated at 12, for the tube 10. The tube 10 is in the form of a cylinder body 14 having a dome 16 closing an end thereof. The insulating ring 12 is an alpha-alumina body forming an exterior flange for the electrolyte tube 10. The components are joined in accordance with the principles of the present invention and once joined are used in a sodium sulfur battery in accordance with the disclosure contained in U.S. Pat. No. 4,207,386, the disclosure of which is hereby incorporated by reference into the present specification. It will be noted that the electrolyte tube when embodied in the battery cell is inverted from the position shown in FIG. 1 so that the dome 14 is at the lower end thereof and the flange is at the upper end thereof. It will be noted that for example in FIG. 1 of U.S. Pat. No. 4,207,386 the electrolyte tube is identified by the numeral 2 and the flange is identified by the numeral 12.

The insulating ring or flange 20 of the present invention includes an interior cylindrical surface 18 which, in the orientation shown in FIG. 1 of the present drawings, extends upwardly from the lower surface of the ring 12. The cylindrical surface 18 intersects with a frusto-conical surface 20 which terminates at the upper surface of the insulating ring. The insulating ring 12 is assembled on the open end of the electrolyte tube 10 by engaging the interior surface 18 of the insulating ring with a portion of the exterior periphery of the cylinder 14 forming the major part of the tube 10. The frusto-conical surface 20 defines with the axially coextensive exterior surface of the cylinder 14 an annular recess 22 which is essentially wedge-shaped in cross-sectional configuration. Mounted within the recess 22, as shown in FIG. 1, is a bonding agent, such as glass. The glass utilized in the bonding agent is devoid of any additives particularly additives such as coupling agents or the like capable of being heated when subjected to microwave energy.

The glass bonding agent, as shown, is a solid body 24 having a solid form shape which is essentially an annular bead with a wedge shaped cross-sectional configuration corresponding with the wedge shaped cross-section of the recess 22 which receives the same.

In accordance with the principles of the present method, the assembled components as shown in FIG. 1 are then placed in an industrial type microwave oven. An example of a microwave oven which may be utilized is a Litton Model 1521 operating at 2.45 gHz with a power output of 700 watts. Preferably, the assembly as shown in FIG. 1 is first placed in an insulating enclosure, such as a closely dimensional ceramic tube which is transparent for microwaves and is heat resistant at the temperature of bonding. The insulating enclosure is desirable, particularly to reduce sodium loss when dealing with sodium sulfur battery parts, although it may be dispensed with if desired. The assembly in the insulating enclosure was exposed to microwaves for a short period of time. Only a few minutes (e.g. 12 minutes) was required to heat the beta-alumina tube to the required temperature of approximately 1100° C. The glass body and the alpha-alumina were heated due primarily to thermal conduction from the betaalumina and to some extent by convection as well. Only a short period of time was required to accomplish cooling (e.g. 18 minutes). As a result of the glass melting and subsequent cooling a strong hermetic seal was formed.

Figure 2:
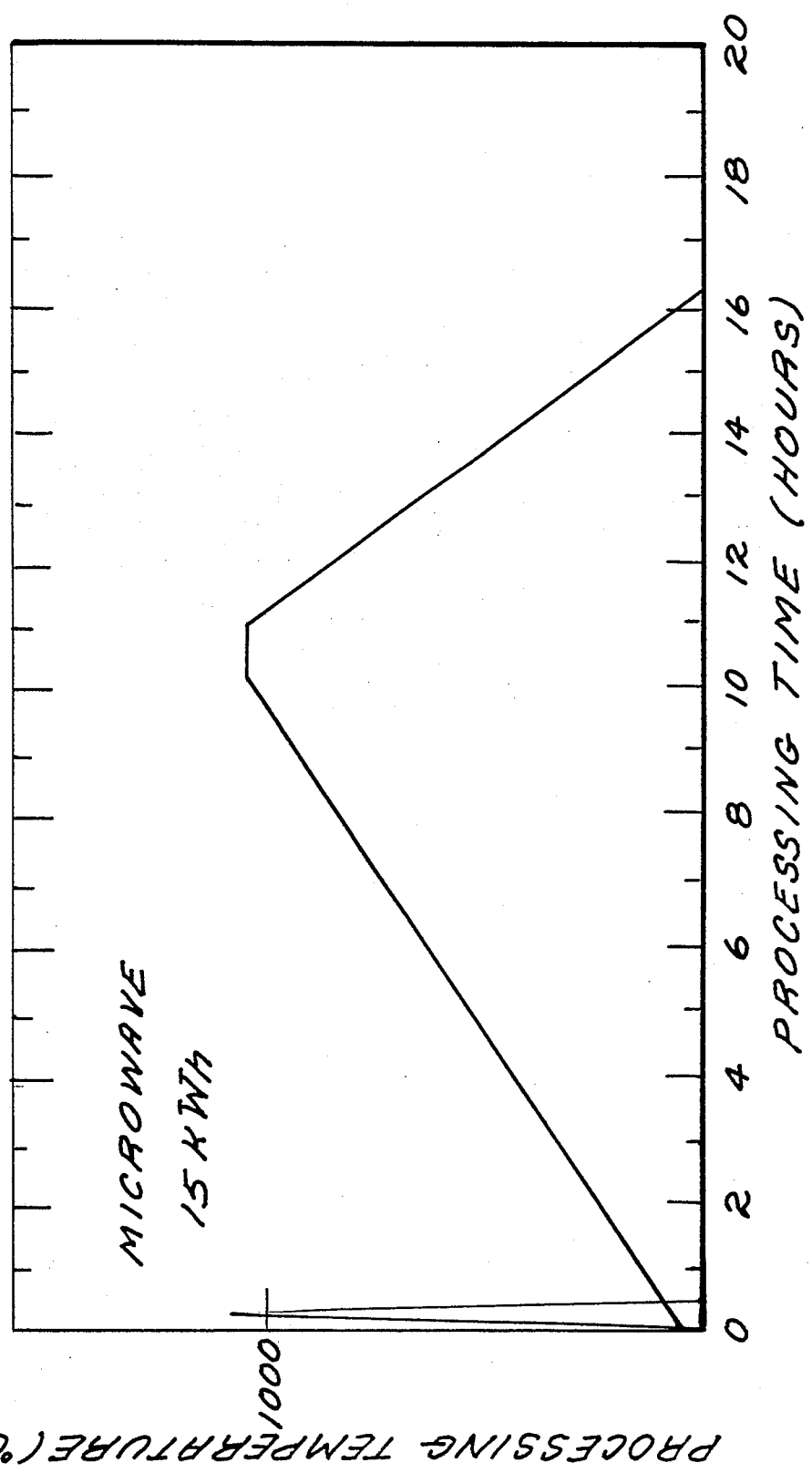
FIG. 2 is a graph illustrating the processing temperature and processing time of the present method as compared with the conventional method utilizing a gas flame or electrical resistance heat source.

The processing time within the microwave oven in accordance with the principles of the present invention is illustrated graphically in FIG. 2 and it will be noted that in the scale shown the application temperature-time relationship represents a relatively high spike configuration. Also included on the graph of FIG. 2 is the temperature time relationship when the same assembly as shown in FIG. 1 is conventionally heated using a gas flame or electrical resistant heat source. As shown on the graph, more than four times more energy is utilized with the conventional gas flame or electrical resistance heat source than with the microwave energy in accordance with the principles of the present invention. Moreover, the duration of the prior art treatment was reduced by more than a factor of 40 in practicing the principles of the present invention.

By utilizing the procedures of the present invention a joint with superior properties is obtained compared to the joint made by conventional heating in a gas or electric furnace. The difference in the quality of the joint is attributed to the different kinetics of the reaction causing extensive diffusion of glass into the alpha-alumina ceramics and resulting in a different microstructure of the joint when microwave heating is applied.

Figure 3:
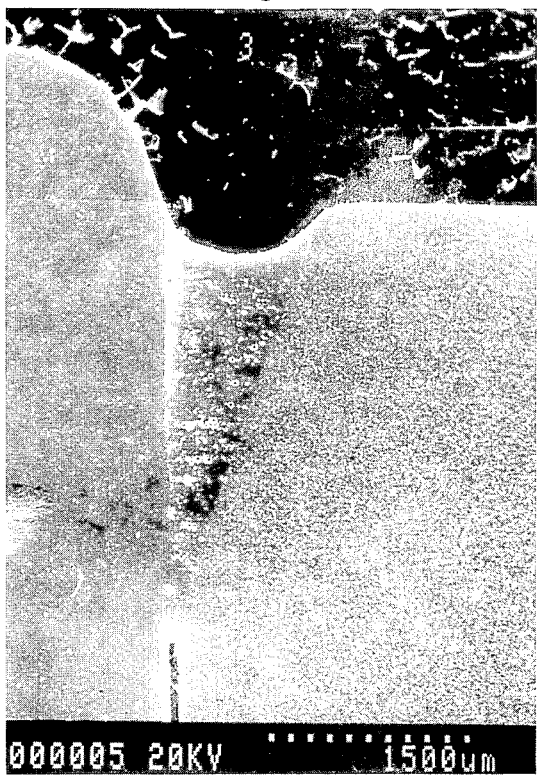
FIG. 3 is a scanning electron microscope microphotograph at 20x of a joint constructed in accordance with the present invention.
Figure 4:
FIG. 4 is a scanning electron microscope microphotograph similar to FIG. 3 showing a comparable joint constructed in accordance with conventional practice.

FIG. 3 illustrates a scanning electron microscope microphotograph at 20K of the joint produced in accordance with the principles of the present invention and it will be noted that it is of comparable or better quality when compared with the conventional joint shown in FIG. 4.

Figure 5:
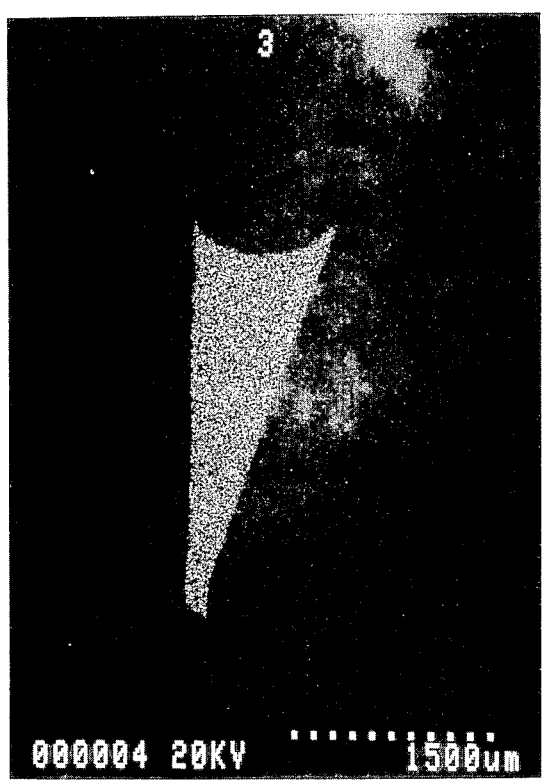
FIG. 5 is an SI map of the seal showing the contour of the glass with high silicon content of the present joint of FIG. 3.
Figure 6:
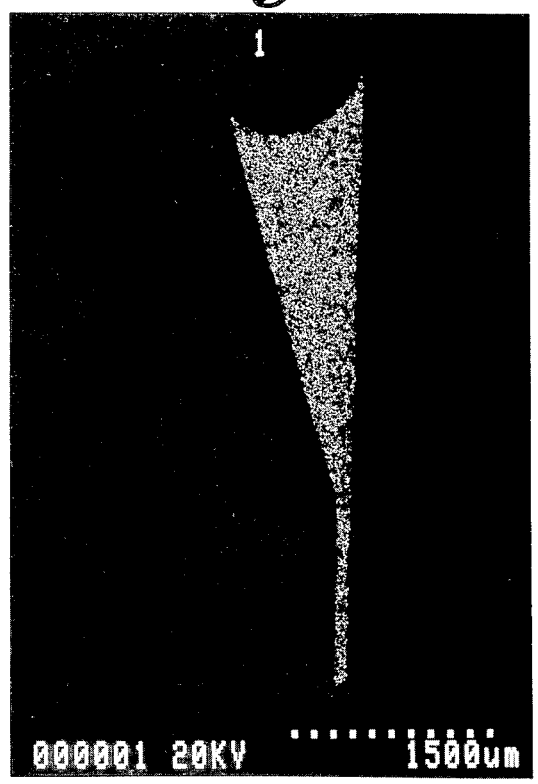
FIG. 6 is an SI map similar to FIG. 5 of the prior art joint of FIG. 4.

FIG. 5 is a silicon map of the joint of the present invention such as shown in FIG. 3 and it will be noted that the configuration of the glass in the joint differs from the configuration in the prior art joint shown in FIG. 6 which has a distinct tail or a flow of glass beyond the recess.

Figure 7:
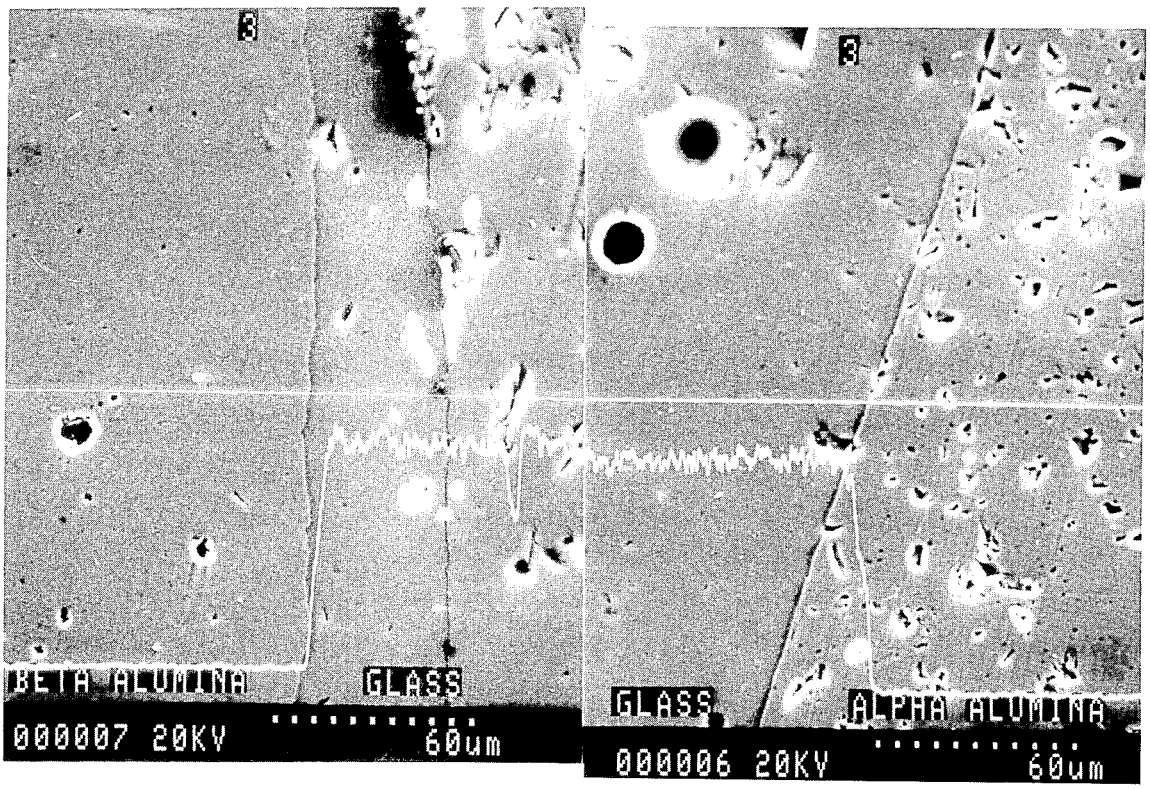
FIG. 7 is a scanning electron microscope and EDAX microphotograph showing an SI line scan of a magnitude of 500x of the present joint of FIG. 3.

Finally, a comparison of the silicon line scan at a magnification of 500x is shown in FIG. 7 of the joint constructed in accordance with the principles of the present invention. It is significant to note that substantial penetration of silicon into the alpha-alumina is shown in the righthand portion of the figure. The comparable penetration of the prior art joint is shown in FIG. 8 and it will be noted that significantly less penetration of silicon into the alpha-alumina is indicated.

Figure 8:
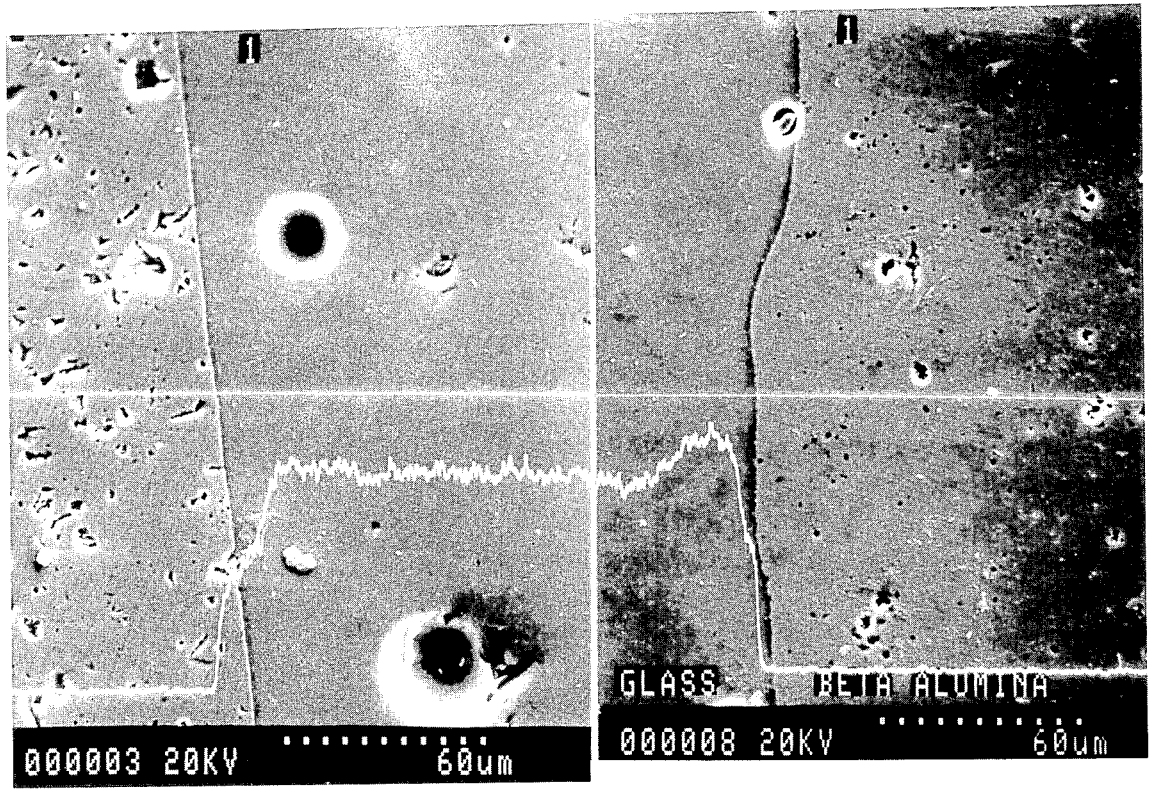
FIG. 8 is a microphotograph similar to FIG. 7 of the prior art joint of FIG. 4.

The difference in configuration as depicted in FIGS. 5 and 6 and the difference in the penetration as depicted in FIGS. 7 and 8 demonstrate a highly desirable joint has been produced by the present invention in comparison with prior art procedures.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A method of producing a joint between a body of beta-alumina and a body of alpha-alumina with a glass bonding agent devoid of coupling additives capable of being heated when subjected to microwave energy, wherein the glass bonding agent is applied in the form of a solid body to a surface of said beta-alumina body and a surface of said alpha-alumina body which comprises subjecting said beat-alumina body and said alpha-alumina body with said glass body engaged to said surfaces thereof to microwave energy from a microwave source so as to heat said beta-alumina body by microwave energy for a time period sufficient to enable the heat generated in said beta-alumina body to be conducted to said glass body and said alpha-alumina body and heat the glass body to a temperature above the glass deformation point, and allowing the bodies to cool to solidify the glass body in intimately penetrating relation to the surfaces of the beta-alumina and alpha-alumina engaged thereby so that the glass body forms a bond between the beta-alumina body and the alpha-alumina body characterized by a fusion of the glass within the engaged beta-alumina and alpha-alumina, the time period to which the bodies are subjected to microwave energy being not substantially longer than that required to heat the glass to said deformation point of the glass.

2. The method as defined in claim 1 comprising employing said beta-alumina body as a solid electrolyte of a sodium/sulphur battery cell in the form of a cylinder having a dome closing an end thereof and said alpha-alumina body is an exterior support for the solid electrolyte in the form of an annular flange having its interior periphery engaged with the exterior periphery of said cylinder at the end thereof opposite said dome.

3. The method as defined in claim 2 comprising employing said glass body in the form of annular bead of wedge shaped cross-section.

4. The method as defined in claim 3 comprising employing a flange having an interior periphery also including a frusto-conical surface defining with an axially coextensive portion of the exterior periphery of said cylinder a wedge shaped recess receiving the wedge shaped annular bead forming said glass body.

* * * * *